(12) United States Patent
Mason

(10) Patent No.: US 12,217,440 B2
(45) Date of Patent: Feb. 4, 2025

(54) IMPROVING THE RESOLUTION OF A CONTINUOUS WAVELET TRANSFORM

(71) Applicant: The Secretary of State for Defence, Salisbury (GB)

(72) Inventor: Paul Mason, Salisbury (GB)

(73) Assignee: The Secretary of State for Defence, Salisbury (GB)

(*) Notice: Subject to any disclaimer, the term of this patent is extended or adjusted under 35 U.S.C. 154(b) by 438 days.

(21) Appl. No.: 17/633,670

(22) PCT Filed: Jul. 28, 2020

(86) PCT No.: PCT/GB2020/000068
§ 371 (c)(1),
(2) Date: Feb. 8, 2022

(87) PCT Pub. No.: WO2021/028647
PCT Pub. Date: Feb. 18, 2021

(65) Prior Publication Data
US 2022/0319022 A1    Oct. 6, 2022

(30) Foreign Application Priority Data
Aug. 9, 2019 (GB) ..................... 1911393

(51) Int. Cl.
*G06T 7/262* (2017.01)
*G06T 7/168* (2017.01)
*G06T 7/32* (2017.01)

(52) U.S. Cl.
CPC .............. *G06T 7/262* (2017.01); *G06T 7/168* (2017.01); *G06T 7/32* (2017.01); *G06T 2207/20064* (2013.01)

(58) Field of Classification Search
None
See application file for complete search history.

(56) References Cited

U.S. PATENT DOCUMENTS

| 2008/0126570 | A1* | 5/2008 | Fujii ..................... H04W 88/02 709/250 |
| 2009/0326351 | A1 | 12/2009 | Addison et al. |
| 2012/0310051 | A1 | 12/2012 | Addison et al. |

OTHER PUBLICATIONS

H. Demirel and G. Anbarjafari, "Satellite Image Resolution Enhancement Using Complex Wavelet Transform," in IEEE Geoscience and Remote Sensing Letters, vol. 7, No. 1, pp. 123-126, Jan. 2010, doi: 10.1109/LGRS.2009.2028440 (Year: 2010).*

(Continued)

*Primary Examiner* — Vu Le
*Assistant Examiner* — Charles C L Penny
(74) *Attorney, Agent, or Firm* — Kilpatrick Townsend & Stockton LLP

(57) ABSTRACT

A computer implemented method of decoding a signal. The method includes receiving a signal (which may be an electromagnetic signal), sampling the received signal to generate an input waveform having magnitude and phase components, applying a transform operation to the input waveform to generate a first decoded signal, and outputting the first decoded signal. The transform operation includes pre-processing the input waveform to generate a mirrored inverted waveform and applying a continuous wavelet transform to the mirrored inverted waveform to generate the first decoded signal. This allows inversion of the frequency and temporal resolution of the continuous wavelet transform, thereby enabling improved temporal and frequency decoding of a signal. The method is particularly suitable for signal filters and filtering units.

15 Claims, 5 Drawing Sheets

(56) References Cited

OTHER PUBLICATIONS

M. Antonini, M. Barlaud, P. Mathieu, and I. Daubechies, "Image coding using wavelet transform," IEEE Transactions on Image Processing, vol. 1, No. 2, pp. 205-220, Apr. 1992. doi:10.1109/83.136597 (Year: 1992).*
International Patent Application No. PCT/GB2020/000068, International Search Report and Written Opinion, dated Oct. 6, 2020.
United Kingdom Patent Application No. 1911393.5, Search Report, dated Feb. 6, 2020.
United Kingdom Patent Application No. 2012020.0, Combined Search and Examination Report, dated Jan. 26, 2021.
Peters et al., "*Chapter 5—The Wavelet Transform*", Jan. 1, 1998 (Jan. 1, 1998), The Fourier Transform in Biomedical Engineering (Applied and Numerical Harmonic Analysis), Birkhäuser, Boston, MA, USA, pp. 129-173, XP008143539, ISBN: 9780817639419.
Chen et al., "*Denoising of Three Dimensional Data Cube Using Bivariate Wavelet Shrinking*", Jun. 21, 2010 (Jun. 21, 2010), Image Analysis and Recognition, Springer, Berlin Heidelberg, pp. 45-51, XP019144857, ISBN: 9783642137716.
Roberge et al., "*Optical Composite Wavelet-Matched Filters*", Optical Engineering, Society of Photo-Optical Instrumentation Engineers, Bellingham, vol. 33, No. 7, Jul. 1, 1994 (Jul. 1, 1994), pp. 2290-2295, XP000455335, DOI: 10.1117/12.172249, ISSN:0091-3286.
Yves, "*Wavelets Made Easy*", USA, Birkhäuser, Jan. 1, 1999 (Jan. 1, 1999), p. 51, XP002800429, ISBN: 9781461268239.
International Patent Application No. PCT/GB2020/000068, International Preliminary Report on Patentability mailed Feb. 17, 2022, 11 pages.

* cited by examiner

IMPROVING THE RESOLUTION OF A CONTINUOUS WAVELET TRANSFORM

CROSS-REFERENCE TO RELATED APPLICATIONS

This application is a national stage application of International Patent Application PCT/GB2020/000068, filed on Jul. 28, 2020 and titled "Improving the Resolution of a Continuous Wavelet Transmission," which claims priority to United Kingdom Patent Application No. 1911393.5, filed on Aug. 9, 2019 and titled "Computer Implemented Method of Decoding a Signal," both of which are hereby incorporated by reference in their entireties.

TECHNICAL FIELD OF THE INVENTION

This invention relates to the field of signal processing, in particular to methods of decoding a signal.

BACKGROUND TO THE INVENTION

Signals are used to transmit information between locations. They may exist as electrical signals propagating in electrical circuitry, or as wireless electromagnetic or acoustic signals propagating over the air or through other media. A transmitted signal may be received directly by an intended recipient such as a mobile phone user in a telecommunications network. Alternatively a signal may be received by an unintended recipient if that recipient is sampling a frequency band that includes the frequency of signal transmission. With particular relevance to the modern electromagnetic environment, signal measurement across even narrow frequency bands can result in a significant quantity of signal noise (undesirable signals) being captured. This contested environment renders it challenging to successfully identify, extract and then process, specific transmitted signals.

An approach often applied to decode signals into a usable form is to apply a Fast Fourier Transform (FFT) to separate out the contributions of different frequencies within captured signal data. This can be useful if a particular frequency of transmission is known, or if a set of particular frequencies can be used to identify a signal and its source. An FFT can be used to obtain a reliable and high resolution frequency spectrum of a received signal, but at the expense of having a poor ability to resolve some transient features of the signal. This is because the FFT operates by processing a window (in time) of a signal transmission and requires a relatively large window to achieve good frequency resolution.

An alternative approach to decoding a signal is to use a continuous wavelet transform (CWT). The CWT involves convolving a mother wavelet with a signal at different positions (in time) through the signal, and with different stretch factors applied to the wavelet. This allows both frequency and temporal features of the signal to be resolved. The resultant decoded signal representation may be used to identify a signal not only by its frequency, but also by its transient features (for instance pulsing effects). However the CWT is fundamentally limited in its application as it can only provide good frequency resolution with poor temporal resolution at low frequencies, and poor frequency resolution with good temporal resolution at high frequencies.

Therefore it is an aim of the present invention to provide an alternative method of decoding a signal that mitigates these issues.

SUMMARY OF THE INVENTION

According to a first aspect of the invention there is provided a computer implemented method of decoding a signal, the method comprising the steps of receiving a signal; sampling the received signal to generate an input waveform having magnitude and phase components; applying a transform operation to the input waveform to generate a first decoded signal; and then outputting the first decoded signal; wherein the step of applying a transform operation comprises the steps of: pre-processing the input waveform to generate a mirrored inverted waveform; and then applying a continuous wavelet transform to the mirrored inverted waveform to generate the first decoded signal. When operating a continuous wavelet transform (CWT) on a signal across a band of frequencies, the decoded signal representation will return relatively good frequency resolution with poor temporal resolution at low frequencies, and relatively poor frequency resolution with good temporal resolution at high frequencies. By pre-processing the input waveform to generated a mirrored inverted waveform, the time and frequency resolution of the continuous wavelet transfer can be reversed, leading to poor frequency resolution but good temporal resolution at low frequencies, and good frequency resolution with poor temporal resolution at high frequencies. Therefore the benefits of using a CWT over other transform techniques (such as Fast Fourier Transforms) can be realised across an entire frequency band by processing both the original input waveform and the mirrored inverted waveform. In particular transient features of a signal can be decoded close to the Nyquist sampling frequency.

The CWT has applications in signal filtering, signal detection, and image compression, amongst other areas. In each case the ability to resolve signal components is important. Currently the CWT inherently will result in decoded signal representations having worsened resolution (for instance overlapping signal components) at some frequencies. This increases the burden on subsequent signal processing to extract accurate signal parameters. The inventor has shown that this burden can be removed by pre-processing the signal to which a CWT is applied, such that resolution inversion can be achieved.

The terms 'decode' or 'decoding' with regard to the invention are intended to mean processing a signal into a usable form. This is necessary in modern signal environments where at least the frequency spectrum is contested. Capturing received signals at a particular frequency or range of frequencies in such an environment is likely to yield an initially unusable signal, owing to signal noise. It is therefore necessary to process the received signal to separate out the various signal components, such that only the useful aspects of a signal are processed further. This reduces signal processing burden.

A 'signal' is intended to mean a physical signal such as an electromagnetic, acoustic or wireless signal. The signal may be received through an antenna and receiver into a computer. Such a signal is sampled (for instance via a receiver and signal capture device such as an oscilloscope or computer input card) in order to generate digital samples upon which digital signal processing can be applied. The digital samples are arranged as a digital input waveform for such processing, as may be achieved by storing the samples as an array in computer memory. Each sample may have an associated magnitude and phase.

The transform operation converts the input waveform to a decoded signal. The decoded signal may be an array having both frequency and time dimensions, and containing numerical values corresponding to the magnitude of a particular frequency at a particular time (or position) in the input waveform. Alternatively the decoded signal may be provided as a digital image of the aforementioned array, wherein each numerical value corresponds to either a greyscale, for instance. The first decoded signal corresponds to the representation of the decoded mirrored-inverted waveform. The decoded signal being 'output' also includes the signal being output as an electromagnetic signal. For instance the signal may be transformed, modified, inverse transformed and output over a wireless or wired communications link. This enables signal filtration or enhancement to be performed before being rebroadcast, for instance.

The mirrored-inverted waveform is a pre-processed version of the input waveform, prior to a CWT being applied. It refers to a waveform whose digital samples are out of phase with the corresponding samples of the input waveform, and whose phase components are scaled by a factor of −1.

Preferably the step of pre-processing the input waveform comprises adding a phase shift of $\pi$ radians to the phase component of the input waveform; and then multiplying the phase component by −1 to generate the mirrored inverted waveform. This provides a computationally efficient means for generating the mirrored-inverted waveform.

Some embodiments of the computer implemented method comprise the steps of modifying the first decoded signal; and then applying an inverse continuous wavelet transform to the modified decoded signal representation, thereby generating a filtered signal. Applying a CWT to the mirrored-inverted waveform allows previously overlapping signal elements to be distinguished in the first decoded signal. Therefore specific elements of a signal can be selected and extracted for processing, or aspects that are noise, or saturation, or other unwanted elements can be nulled or zeroed prior to an inverse transform being applied to generate a clean filtered signal. Even more preferable therefore is that the step of modifying the first decoded signal comprises removing one or more frequencies from the first decoded signal. These embodiments of the method are particularly suited to use in signal filters and for cleaning a signal prior to subsequent signal processing.

Some embodiments of the method comprise the step of comparing the first decoded signal to a plurality of known signal representations using a comparison operation, and identifying the received signal therefrom. The plurality of known signal representations may be amplitude and frequency data stored as a library of known signal representations within a computer system. The comparison operation may be a convolution of the first decoded signal with the known signal representations, to identify a known signal that best matches the first decoded signal.

In some embodiments the comparison operation comprises passing the first decoded signal to a machine learning algorithm trained to detect at least one of the known signal representations. The machine learning algorithm may be a supervised algorithm using regression or classification. For instance the machine learning algorithm may be trained on many representations of one known signal, obtained from many different environments. The machine learning algorithm having learnt to identify key features of a known signal such as frequency, amplitude, pulse patterns. The machine learning algorithm may have been trained on a plurality of different known signals in this manner. This mitigates the requirement to provide a physical library of known signal representations when the computer implemented method is deployed.

In some embodiments the first decoded signal and the plurality of known signal representations are provided as digital images. This enables image processing techniques to be utilised to compare and identify the original received signal. For instance the first decoded signal may be an image showing resolved frequencies and temporal features (i.e. transient pulsing) of the received signal. Additionally a colour coding may be applied to represent signal amplitude. In these embodiments it is even more preferable that the step of comparing the first decoded signal to the plurality of known signal representations comprises comparing the first decoded signal to each of the plurality of known signal representations using an image comparison operation, and in each case generating a measure of similarity; and then identifying as the received signal, the known signal representation corresponding to an optimum value of the measure of similarity. These embodiments improve the accuracy of signal identification.

In even more preferred embodiments, the step of comparing the first decoded signal to each of the plurality of known signal representations using an image comparison operation, comprises: segmenting the first decoded signal into a plurality of image segments; and then comparing at least one of the segments to each of the plurality of known signal representations using the image comparison operation, and in each case generating the measure of similarity. Where the first decoded signal is a digital image, it can be segmented either by a user identifying segments of the image using an interface device (such as a mouse) or by a segmentation operation or algorithm within the computer. Each segment comprises a section of interest of the first decoded signal image—for instance a particular frequency; or a set of amplitudes and transient features at one or more frequencies. The known signal representations may then be compared to only a single segment or a plurality of segments. These embodiments are well suited to received signals that are composite signals (comprise multiple signals), and accurate signal identification requires each of the signals composing the received signal to be individually identified. Such a scenario may be faced when seeking to distinguish and remove known signals in a received signal from unknown signals that may require further analysis, for instance.

It is preferable that in embodiments comprising an image comparison operation, the operation is a correlation such as a cross-correlation or a phase correlation. The measure of similarity may therefore be a correlation score. Each known signal representation may be compared to the first decoded signal and a correlation score generated for each, the minimum value of which being the optimum value.

Certain embodiments of the computer implemented method further comprise the step of applying a continuous wavelet transform to the input waveform to generate a second decoded signal. By providing both the first and second decoded signals, transient and frequency elements of a received signal can be completed decoded across the entire frequency range of the received signal. This means when combined, there will be no overlapping features in the decoded signal. This provides an improved signal for subsequent signal and/or image processing.

When applying the CWT to the mirrored inverted waveform to generate a first decoded signal, the CWT is in effect being applied to a set of false frequencies to benefit from resolution inversion. This means that after the CWT has been applied, the first decoded signal may require realigning/correction of frequencies, depending upon subsequent signal or image processing requirements. For instance if a digital image of the first decoded signal is being compared to known signal representations (as digital images) then it is the image representation that is important, and not the ability to extract specific frequencies directly. However, if the first decoded signal is being used to identify and extract specific frequency data, the frequencies of the first decoded signal will need correcting. This can be performed by dividing the sampling frequency by 2 and subtracting the first decoded signal frequencies to obtain the original frequencies.

According to a second aspect of the invention there is provided a computer program containing instructions which when executed by a computer perform the steps of the first aspect of the invention. The computer program may conveniently be installed onto a data processing means such as a standalone computer or may be installed into a signal processing unit, signal filtering unit, or signal decoding unit.

According to a third aspect of the invention there is provided a computer-readable data carrier, having stored thereon the computer program of the second aspect of the invention. For signal processing units, filtering units or decoding units, into which installation directly of software may not be possible, interfacing with computer-readable data carriers may be a suitable alternative. The method may be provided on a CD for use within a computer for instance using a CD reader.

According to a fourth aspect of the invention, there is provided signal decoding apparatus comprising receiver means for receiving a signal, connected to a computer for carrying out the method of the first aspect of the invention. The receiver means may be an antenna and receiver. The signal decoding apparatus may therefore be a signal analyser or other signal capture device. The signal decoding apparatus may form part of a wireless device, such as a mobile phone for instance.

BRIEF DESCRIPTION OF THE DRAWINGS

Embodiments of the invention will now be described by way of example only and with reference to the accompanying drawings, in which:

FIG. 2a provides an illustration of a first step in generating a mirrored-inverted waveform variant of FIG. 1a;

FIG. 2b provides an illustration of a second step in generating a mirrored-inverted waveform variant of FIG. 1a;

DETAILED DESCRIPTION

Figure 1A:
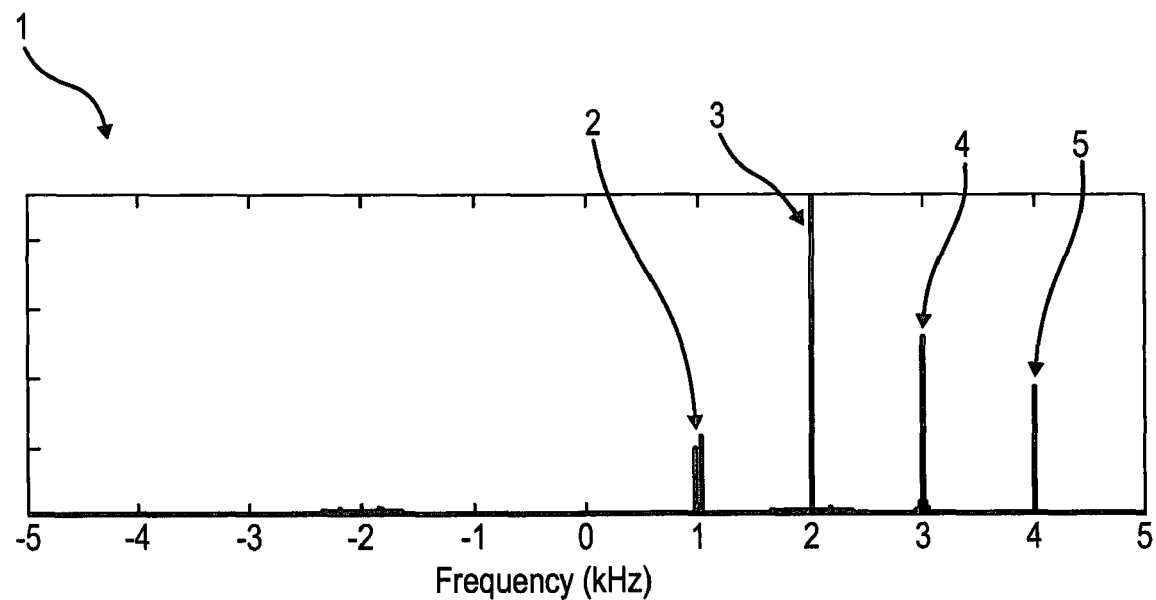
FIG. 1a provides an illustration of frequency components in an embodiment of an input waveform.

FIG. 1a provides an illustration of frequency components 1 in an embodiment of an input waveform sampled from a received signal. The frequency components 1 comprise frequencies at 1 kHz, 2 kHz, 3 kHz and 4 kHz (labelled 2, 3, 4 and 5 respectively). The 1 kHz frequency (labelled as 2) comprises a plurality of frequencies in the vicinity of 1 kHz.

Figure 1B:
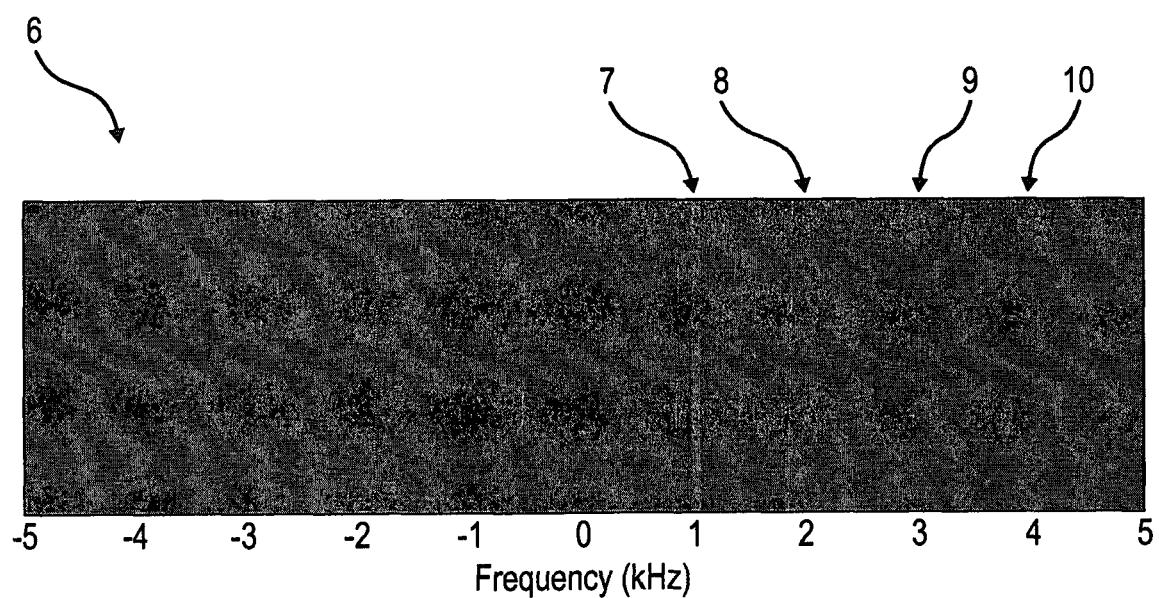
FIG. 1b provides an illustration of the input waveform represented in FIG. 1a as a prior art spectrogram.

FIG. 1b provides an illustration 6 of the input waveform of FIG. 1a as a prior art spectrogram. The illustration 6 may be considered the decoded signal. The illustration 6 shows frequency components identified in the input waveform. The 1 kHz, 2 kHz, 3 kHz and 4 kHz frequencies (labelled as 7, 8, 9, and 10 respectively) have been identified, but any transient effects such as pulsing are not evident. This is typical of prior art FFT techniques and places significant burden on subsequent signal processing to identify and extract specific features of the input waveform.

Figure 1C:
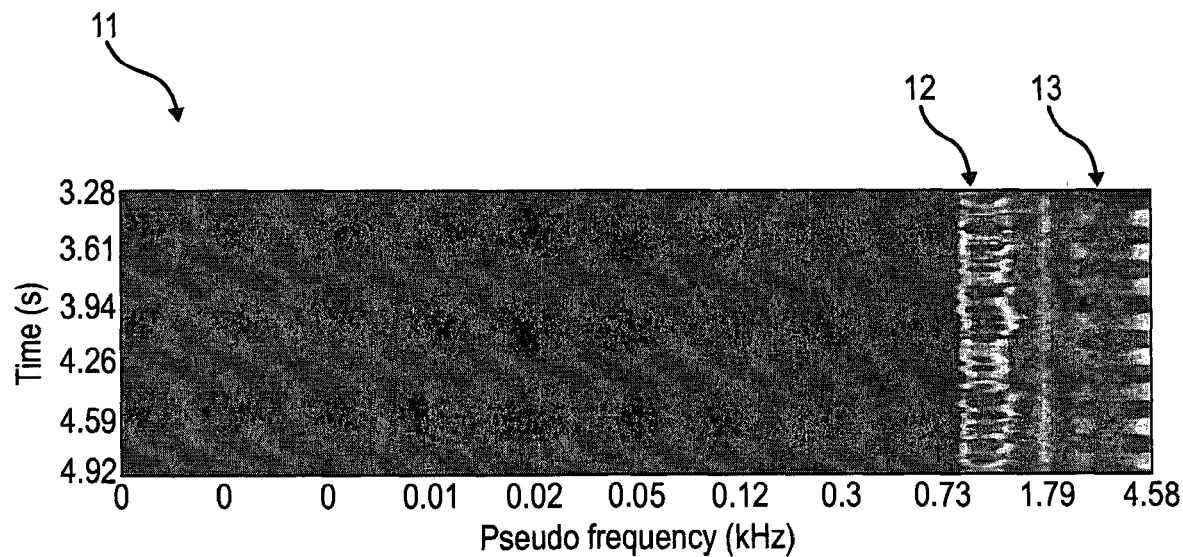
FIG. 1c provides an illustration of the input waveform represented in FIG. 1a, decoded by prior art continuous wavelet transform.

FIG. 1c provides an illustration 11 of the input waveform represented by FIG. 1a, decoded by a prior art continuous wavelet transform (CWT). The illustration 11 may be considered the decoded signal, visualised as frequency versus time, and in false colour indicating signal amplitude. A CWT involves convolving a mother wavelet with an input waveform at a number of different positions, and with a number of different mother wavelet stretch factors. Typically the stretch factors are multiples of 2, and therefore the decoded signal will be logarithmic in nature. The 1 kHz frequencies 12 have been well resolved by the CWT. However the higher frequencies 13 are ambiguous, despite a clear transient pulsing being evident.

Figure 1D:
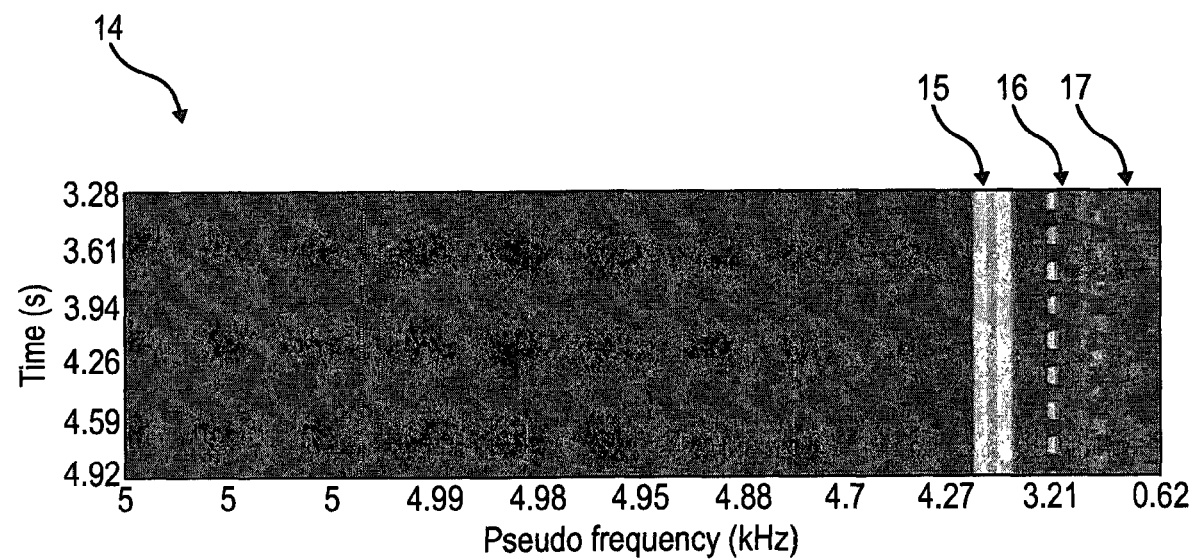
FIG. 1d provides an illustration of the input waveform represented in FIG. 1a, decoded by an embodiment of the computer implemented method.

In contrast FIG. 1d provides an illustration 14 of the input waveform represented by FIG. 1a, decoded by an embodiment of the computer implemented method. The illustration 14 may be considered the decoded signal, visualised as frequency versus time, and in false colour indicating signal amplitude. The higher frequencies are now unambiguous, in particular the 4 kHz and 3 kHz frequencies (15 and 16 respectively) are now well resolved. However the transient pulsing nature of the 4 kHz frequencies have now been lost. The 1 kHz frequency 17 is now ambiguous, albeit now confirmed as a near continuous wave signal. Therefore FIG. 1d shows a resolution inversion of a CWT achieved through pre-processing of the input waveform. This enables feature identification and extraction of signals not possible with standard CWT processing. In particular, the combination of the first decoded signal 14 in FIG. 1d and the second decoded signal 11 in FIG. 1c, allows for any given frequency a good temporal resolution and a good frequency resolution. The frequency axis in FIG. 1d has been realigned by taking the sample frequency divided by 2 and subtracting the axis values of FIG. 1c.

Figure 2A:
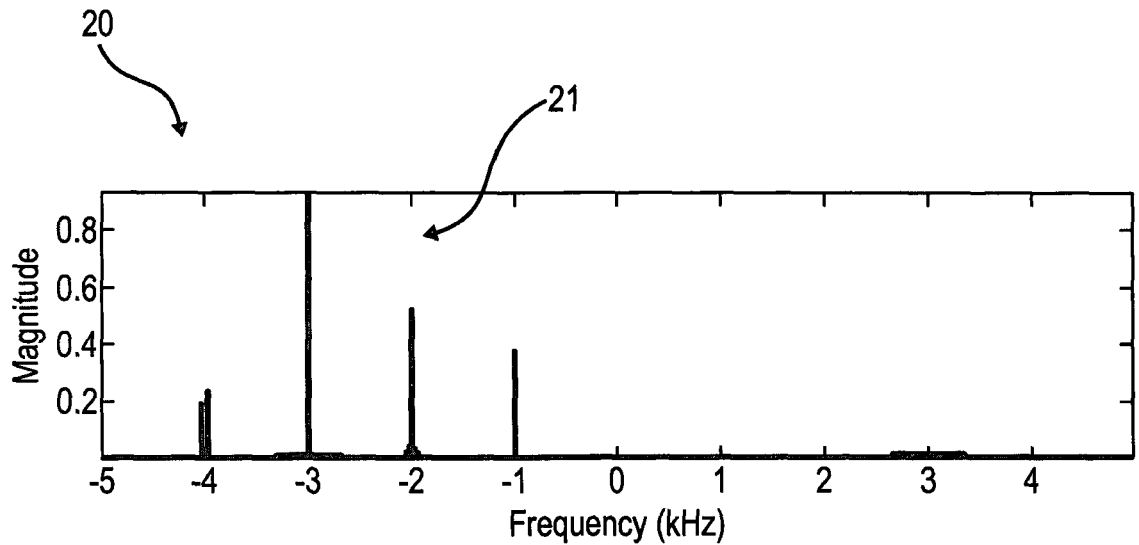
Figure 2B:
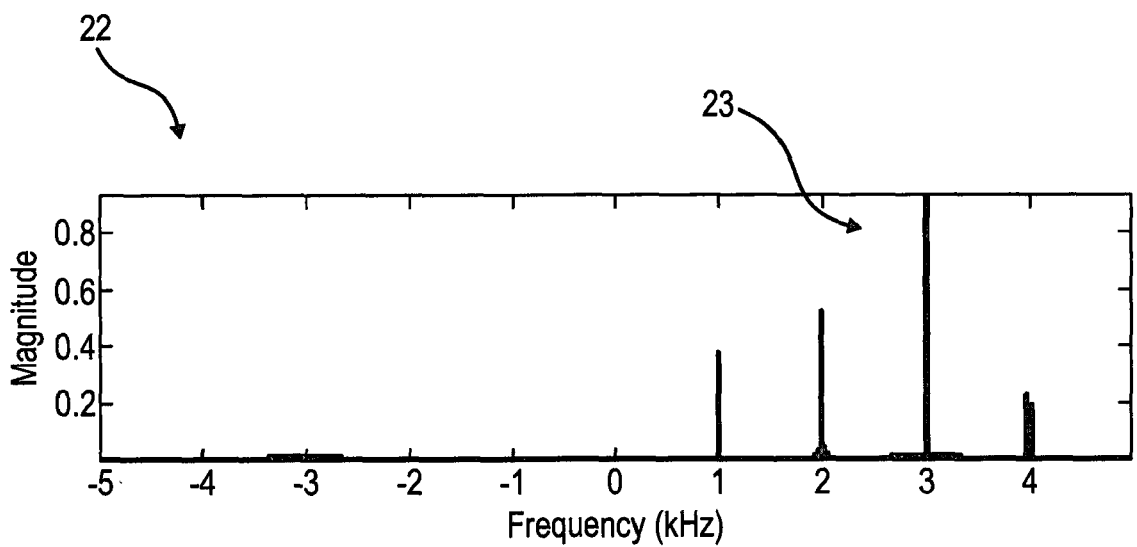

FIG. 2a provides an illustration 20 of a first step in generating a mirrored inverted variant of FIG. 1a. The illustration 20 shows a set of frequencies 21 to which a phase difference of 180° has been applied. This has shifted frequencies 21 along the frequency axis in comparison to FIG. 1a. FIG. 2b provides an illustration 22 of a second step in generating a mirrored inverted variant of FIG. 1a. The illustration 22 shows the frequencies 21 of FIG. 2a, mirrored through multiplying respective phase components by −1. The results are frequencies 23. The illustration 22 provides an embodiment of a mirrored inverted waveform for subsequent processing by CWT. The mirrored inverted waveform 22 essentially comprises the same amplitude and temporal features, but at a false set of frequencies. This enables the resolution of the CWT to be inverted. Following application of the CWT the frequencies of the first decoded signal can be corrected by dividing the sampling frequency by 2 and subtracting the frequencies of the first decoded signal.

Figure 3:
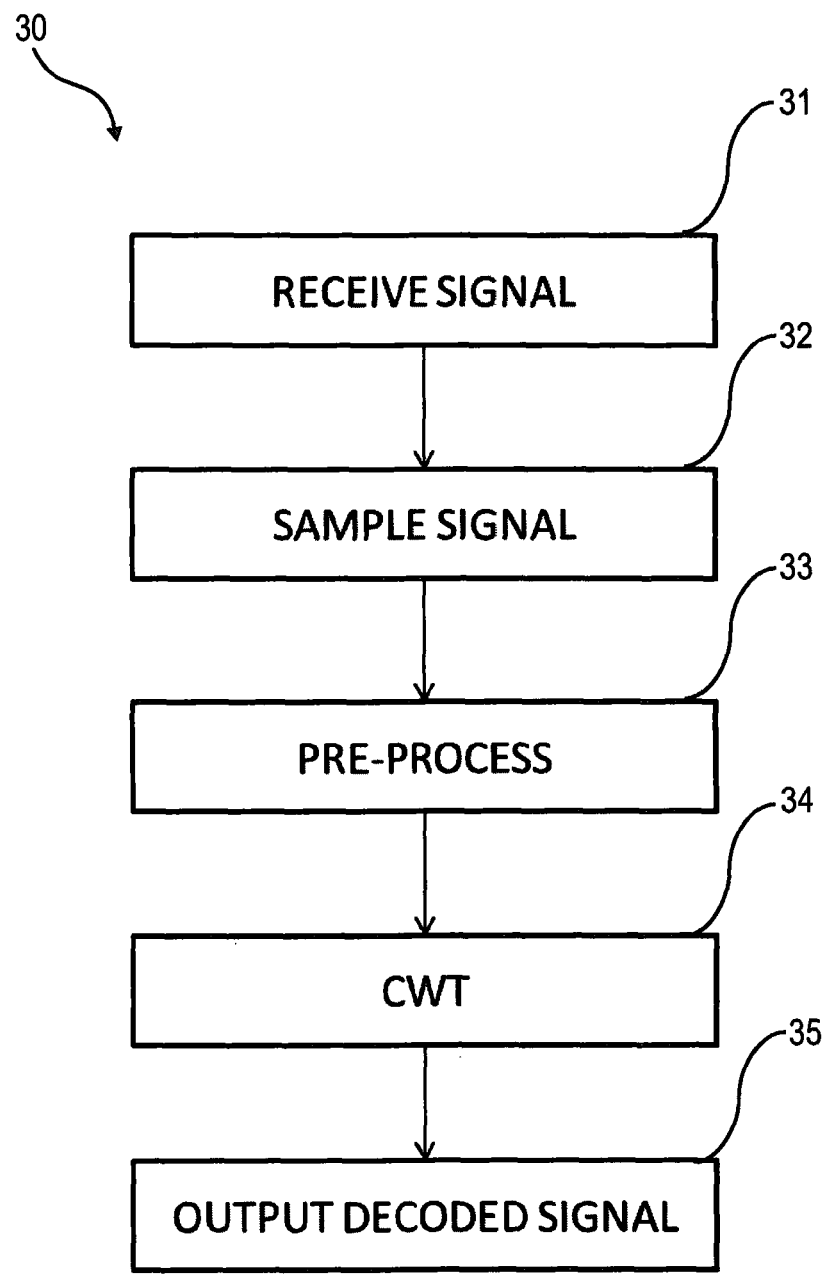
FIG. 3 illustrates the steps of an embodiment of the computer implemented method.

FIG. 3 provides an illustration of the computer implemented method 30 as a flow diagram. The step of receiving a signal 31 involves receiving a signal into a computer. The step of sampling a signal 32 involves sampling the received signal at a sampling frequency to generate an input waveform for subsequent processing. The step of pre-processing 33 involves generating a mirrored inverted waveform by taking each sample of the input waveform and applying a phase shift of 180° and then multiplying the phase components of the samples by −1. The step of applying a CWT 34 involves applying a CWT to the mirrored inverted waveform to generate a first decoded signal. The first decoded signal is then output 35 as a more useful signal than the received signal, enabling more efficient signal processing.

Figure 4:
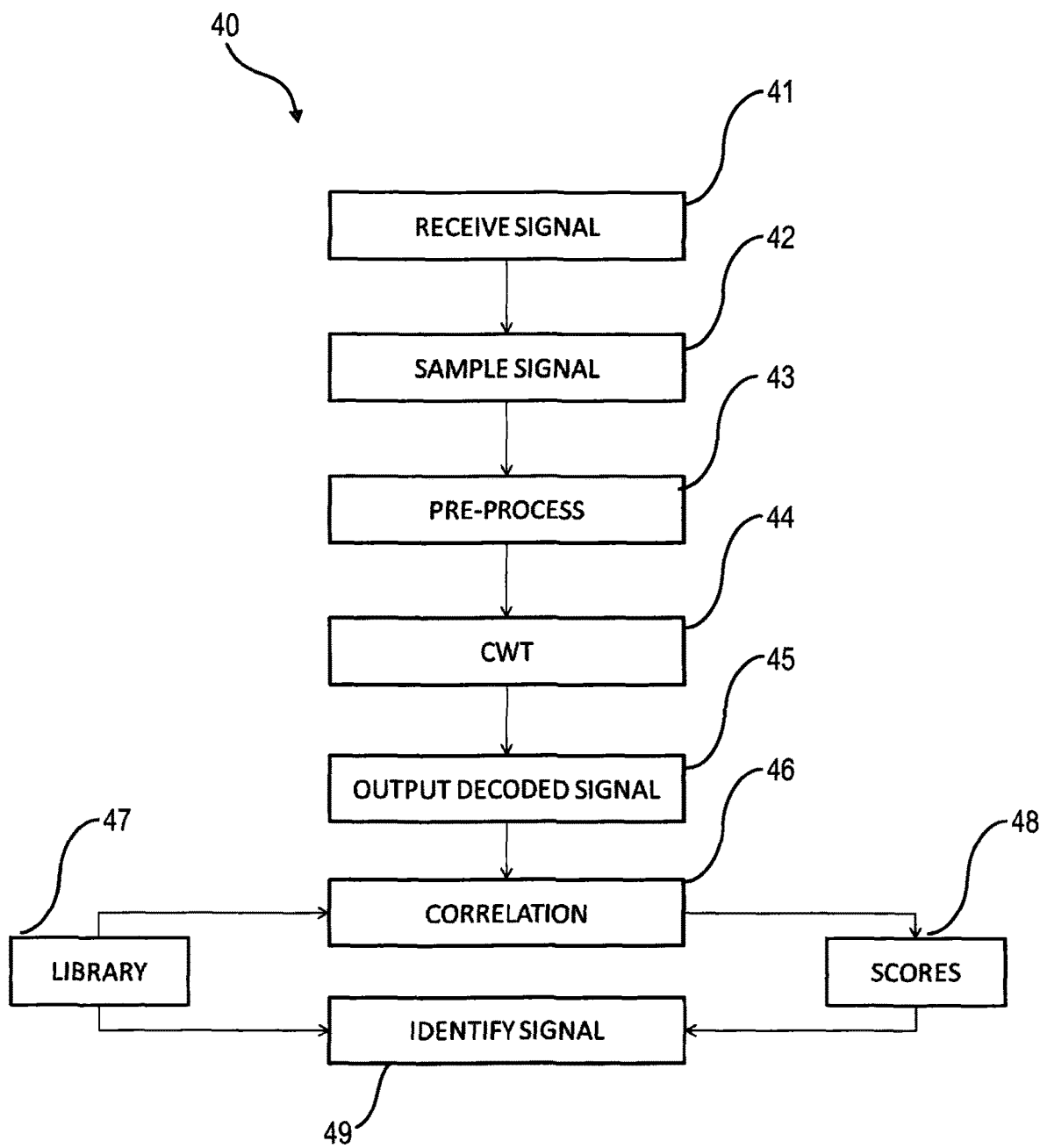
FIG. 4 illustrates the steps of an embodiment of the computer implemented method using image comparison.

FIG. 4 provides a further illustration of an embodiment of the computer implemented method 40. In this embodiment of the method 40, a signal is received 41, sampled 42, pre-processed 43, a CWT is applied 44 and the first decoded signal is output 45. However in this embodiment the first decoded signal it output as a digital image. A library of known signals 47 is available inside a computer system, and accessible by the computer system carrying out the method 40. The library of known signals 47 are digital image representations of the known signals. A digital image correlation is applied between each known signal in the library of known signals 47 and the output first decoded signal 45. In each case a correlation score is generated 48. A minimum value for the correlation scores 48 is identified and the corresponding known signal in the library of known signals 47 is identified as the original received signal 49.

The embodiments described may be embodied within software within a computer, a signal decoder, upon computer readable media. The first decoded signals may be further refined prior to subsequent signal processing by extraction or smoothing of signal features identifiable in the first decoded signal. Any embodiment may also comprise generating a second decoded signal in addition to the first decoded signal. The second decoded signal may be obtained by applying a CWT to the input waveform (not the mirrored inverted waveform). Other comparison operations may be utilised in embodiments where a signal is being identified. For instance an artificial intelligence (AI) algorithm may be trained on a plurality of image based first decoded signals, such that in-use the first decoded signal (and second decoded signal optionally) are processed by the AI algorithm seeking to detect one or more different signals.

The invention claimed is:

1. A computer implemented method of decoding a signal, the method comprising the steps of:
   Receiving a signal;
   Sampling the received signal to generate an input waveform having magnitude and phase components;
   Applying a transform operation to the input waveform to generate a first decoded signal;
   and then
   Outputting the first decoded signal,
   wherein the step of applying a transform operation comprises the steps of:
   Pre-processing the input waveform to generate a mirrored inverted waveform;
   and then
   Applying a continuous wavelet transform to the mirrored inverted waveform to generate the first decoded signal.

2. The computer implemented method of claim 1, wherein the step of pre-processing the input waveform comprises the steps of:
   Adding a phase shift of It radians to the phase component of the input waveform; and then
   Multiplying the phase component by −1 to generate the mirrored inverted waveform.

3. The computer implemented method of claim 1, further comprising the steps of:
   Modifying the first decoded signal; and then
   Applying an inverse continuous wavelet transform to the modified decoded signal, thereby generating a filtered signal.

4. The computer implemented method of claim 3, wherein modifying the first decoded signal comprises removing one or more frequencies from the first decoded signal.

5. The computer implemented method of claim 1, further comprising the step of:
   Comparing the first decoded signal to a plurality of known signal representations using a comparison operation and identifying the signal therefrom.

6. The computer implemented method of claim 5, wherein the comparing comprises passing the first decoded signal to a machine learning algorithm trained to detect at least one of the known signal representations.

7. The computer implemented method of claim 5, wherein the first decoded signal and plurality of known signal representations are provided as digital images.

8. The computer implemented method of claim 7, wherein comparing the first decoded signal to the plurality of known signal representations comprises:
   Comparing the first decoded signal to each of the plurality of known signal representations using an image comparison operation, and in each case generating a measure of similarity; and then
   Identifying as the signal, the known signal representation corresponding to an optimum value of the measure of similarity.

9. The computer implemented method of claim 8, wherein comparing the first decoded signal to each of the plurality of known signal representations using an image comparison operation comprises:
   Splitting the first decoded signal into a plurality of image tiles; and then
   Comparing at least one of the tiles to each of the plurality of known signal representations using the image comparison operation, and in each case generating the measure of similarity.

10. The computer implemented method of claim 8, wherein the image comparison operation is a correlation.

11. The computer implemented method of claim 1, further comprising the step of:
    Applying a continuous wavelet transform to the input waveform to generate a second decoded signal.

12. The computer implemented method of claim 1, further comprising the step of:
    Realigning frequency values of the first decoded signal.

13. A non-transitory computer-readable medium containing instructions which when executed by a computer perform the steps of claim 1.

14. A non-transitory computer-readable medium, having stored thereon a program containing instructions which when executed by a computer perform the steps of claim 12.

15. A signal decoder comprising receiver means for receiving a signal, the signal decoder connected to a computer comprising means for carrying out the method of claim 1.

* * * * *